(12) United States Patent
Bian

(10) Patent No.: US 8,962,789 B2
(45) Date of Patent: Feb. 24, 2015

(54) METHOD FOR PREPARING MODIFIED POLY (1,3-PROPANEDIOL TEREPHTHALATE)

(75) Inventor: Shuchang Bian, Wujiang (CN)

(73) Assignee: Jiangsu Zhonglu Technology Development Co., Ltd, Wujiang, Jiangsu (CN)

( * ) Notice: Subject to any disclaimer, the term of this patent is extended or adjusted under 35 U.S.C. 154(b) by 0 days.

(21) Appl. No.: 13/579,940

(22) PCT Filed: Feb. 24, 2011

(86) PCT No.: PCT/CN2011/071216
§ 371 (c)(1),
(2), (4) Date: Aug. 19, 2012

(87) PCT Pub. No.: WO2011/131057
PCT Pub. Date: Oct. 27, 2011

(65) Prior Publication Data
US 2012/0316315 A1    Dec. 13, 2012

(30) Foreign Application Priority Data
Apr. 22, 2010    (CN) .......................... 2010 1 0155863

(51) Int. Cl.
*C08G 63/183* (2006.01)
*C08G 63/80* (2006.01)
*C08G 63/672* (2006.01)
*D01F 6/62* (2006.01)

(52) U.S. Cl.
CPC ............ *C08G 63/672* (2013.01); *C08G 63/183* (2013.01); *C08G 63/80* (2013.01); *D01F 6/62* (2013.01)
USPC .......................................... 528/279; 525/444

(58) Field of Classification Search
CPC .... C08G 63/85; C08G 63/183; C08G 63/672; C08G 63/80; C08L 67/025
USPC .......................................... 525/444; 528/279
See application file for complete search history.

(56) References Cited

U.S. PATENT DOCUMENTS

| 5,340,909 | A | 8/1994 | Doerr et al. |
| 8,614,287 | B2 | 12/2013 | Bian |
| 2002/0123606 | A1* | 9/2002 | Kurian et al. ................. 528/279 |
| 2009/0305594 | A1* | 12/2009 | He et al. ....................... 442/400 |
| 2012/0316292 | A1 | 12/2012 | Bian |

FOREIGN PATENT DOCUMENTS

| CN | 101817921 | A | 0/2010 |
| CN | 101376703 | A | 3/2009 |
| CN | 101463123 | A | 6/2009 |
| CN | 101469060 | A | 7/2009 |
| CN | I01469060 | A | 7/2009 |
| CN | 101817921 | A | 9/2010 |
| JP | 2003227033 | A | 8/1994 |

OTHER PUBLICATIONS

Machine translation of CN 10137603—Description.*
Yong Xu; Synthesis and crystallization behavior of poly(trimethylene terephthalate)-poly(ethylene glycol) segmented copolymers; J Mater Sci; 2007; vol. 42; p. 8381-8385/.
Qial Yu; Study of systhesis and phase-change characteristic of PTT-PEG block copolymer, Tianjin Textile science and technology; 2009; issue 4; pp. 15018.
Yong Xu, Synthesis and crystallization behavior of poly(trimethylene terephthalate)-poly (ethylene glycol) segmented copolymers, J Mater Sci, 2007, vol. 42, pp. 8381-8385.
Qiao Yu, Study of systhesis and phase-change characteristic of PTT-PEG block copolymer, Tianjin Textile science and technology, 2009, issue 4, pp. 15018.

* cited by examiner

*Primary Examiner* — Mark Kaucher
(74) *Attorney, Agent, or Firm* — Stites & Harbison PLLC; Cong Ding

(57) ABSTRACT

A method is disclosed herein for the preparation of modified poly (1,3-propanediol terephthalate). The method comprises adding linear polyester with average molecular weight of 800~3000 and polyethylene glycol with average molecular weight of 200~2000 into polymerization monomers before polymerization reaction, wherein the linear polyester is a polymer obtained by reaction of C3 ~C10 straight chain aliphatic dicarboxylic acid or 1,4-cyclohexane diformic acid with C2 ~C10 straight chain aliphatic diol or 1,4-cyclohexane diformic acid; the linear polyester is 0.5%~6% of the mass of polymerization monomers; the polyethylene glycol is 0.5%~8.5% of the mass of polymerization monomers.

15 Claims, No Drawings

METHOD FOR PREPARING MODIFIED POLY (1,3-PROPANEDIOL TEREPHTHALATE)

CROSS REFERENCE TO RELATED APPLICATIONS

This application is a §371 National State Application of PCT/CN2011/071216 filed Feb. 24, 2011 which claims priority to CN 201010155863.8 filed Apr. 22, 2010, and was issued on Sep. 7, 2011 with issue number CN10817921.

FIELD OF THE INVENTION

The present invention relates to a method for preparing polyester, especially a method for preparing poly (1,3-propanediol terephthalate).

BACKGROUND OF THE INVENTION

PTT polyester is a novel aromatic polyester product of organic polymer which together with PET and PBT belongs to the same polymer series. It is prepared through esterification and polycondensation using refined terephthalic acid and 1,3-propylene glycol as the beginning raw material.

Successful development of PTT has further enriched chemical fiber products series. Firstly, distinct from PET polyester which is almost linear in macromolecular conformation, molecular conformation of PTT polymer is spiral, which will allow PTT fiber to be highly "puffed" and endow its fiber with good elasticity; secondly, PTT polyester has a lower glass-transition temperature and thus apt to take low temperature phase transition, which can effectively eliminate influence on fabric by external stress, and allow its fiber and textile be dyed at a lower temperature with good dyeing properties of disperse dyes; thirdly the Young's modulus of PTT fiber is lower. Its textile shows very soft hand feel and good bulkiness. Its fabrics possess good elastic recovery function, and thus called "Memory Fiber".

Because of above advantages, PTT polyester and its fiber are widely and fast popularized in chemical fiber field. Up to now, the following two aspects are most widely used in the market: In one aspect, parallel composite elastic fiber that has elastic function similar to polyurethane fiber and obtains very good effects with its textile having very good elastic recovery and bulky function when used in fabric substituting for polyurethane fibre is spinned making use of the different shrink function of the two composition PTT and PET; In another aspect, conjugate spinning or combing with other fibers is conducted making use of the lower glass temperature and the easiness to take phase transition upon friction at normal temperature owned by its fiber, so that the flatness variation of the fabric caused by outer force will be eliminated, making the fabric easier to take care, producing effect of "one touch smooth", and fabricating so called "Memory Fabric".

Over the years, people have done a lot beneficial modification to conventional polyester PET, so that modified terylene gains a lot excellent performance and thus be widely used. Great progress has been seen in the diversity and comfort aspect. Seen from applicability aspect, PET polyester fiber among all types of human synthetic fibers is most suitable for human need and also a most widely used polyester fiber at present. Although PTT fiber possesses its unique advantages, there are still certain defects in some performance aspects. Therefore, besides to enlarge the application of conventional PTT fiber, modification and differentiation of PTT polyester and its fiber must be done cooperating with development of modified PET polyester fiber in order to better use features of PTT fiber.

PTT polyester has unique molecular structure with molecules being apt to approach to each other. Therefore, PTT polyester possesses crystallization property similar to Nylon 6. Its crystallization speed during spinning is fast and crystallization degree is high. Minor variation of spinning condition can change inner structure of PTT fiber, leading to different uniformity of the fiber, which will bring great difficulty to adjustment of spinning process. In addition, in prior art, spinning of PTT polyester is generally carried out at a relatively low temperature in order to prevent degradation of melt, as a result, color bar or chromatic difference is formed due to insufficient crystallization of fiber during winding and stretching process. Although the fabric thus obtained has good hand feel and quality, phenomena that the fiber recrystallizes under tension when stretched by outer force exist during starching, weaving, printing and dyeing process and even for ready-made clothes. The fabric is apt to form chromatic difference and color bar during weaving, printing and dyeing process, and for ready-made clothes lead to scratch and white bar forming mechanical damage that is unrecoverable. All the time, these defects have been restricting the application of fiber of PTT polyester and leading directly to difficulties in caring of PTT fabrics and clothes.

SUMMARY OF THE INVENTION

It is an object of the present invention to provide a modified method for preparing poly(1,3-propanediol terephthalate) to improve the crystallinity of the polyester, and thereupon improving the use properties of the fiber prepared by the polyester.

In order to accomplish above object, present invention adopts the following technical scheme:

A method for preparing modified poly (1,3-propanediol terephthalate), comprising following steps:

1. Esterification reaction: forming polymerization monomers by reacting terephthalic acid and 1,3-propylene glycol at the presence of esterification catalyst and at temperature of 220° C.~260° C., wherein the molar ratio of terephthalic acid to 1,3-propylene glycol being 1:1.2~1.8;

2. Polymerization reaction: forming the poly (1,3-propanediol terephthalate) by carrying out the polymerization reaction of polymerization system including polymerization monomers prepared by step (1) and polymerization catalyst at temperature of 240° C.~280° C., Wherein, in step (2), the polymerization system further includes linear polyester with average molecular weight of 800~3000 and polyethylene glycol with average molecular weight of 200~2000, wherein, the linear polyester being a polymer obtained by reaction of C3~C10 straight chain aliphatic dicarboxylic acid or 1,4-cyclohexane diformic acid with C2~C10 straight chain aliphatic diol or 1,4-cyclohexane dimethanol, the amount of the linear polyester added being 0.5%~6% of the mass of the polymerization monomers, the amount of the polyethylene glycol added being 0.5%~8.5% of the mass of the polymerization monomers.

According to the present invention, the straight chain aliphatic dicarboxylic acid may be selected from the group consisting of 1,3-propanedioic acid, 1,4-butanedioic acid, 1,5-pentadioic acid, 1,6-hexanedioic acid, 1,7-heptanedioic acid, 1,8-octanedioic acid, 1,9-Nonanedioic acid and 1,10-decanedioic acid. The straight chain aliphatic diol may be selected from the group consisting of 1,2-ethylene glycol, 1,4-butylene glycol, 1,5-pentylene glycol, 1,6-hexamethylene glycol, 1,7-heptamethylene glycol, 1,8-octamethylene glycol, 1,9-Nonamethylene glycol and 1,10-decamethylene glycol.

Preferably, the linear polyester is selected from the group consisting of poly(buthylene succinate), poly(ethylene glycol adipate), poly(butylene adipate), poly(hexamethylene adipate) and poly (hexylene succinate).

Preferably, the amount of the linear polyester added is 1%~3% of the mass of the polymerization monomers. The average molecular weight of polyethylene glycol is 200~1500, and preferably, the amount of polyethylene glycol added is 0.5%~3% of the mass of the polymerization monomers.

According to one particular aspect of the present invention, a mixture of titanium chelate and polymerization catalyst of antimony series is used as the polymerization catalyst. An additive is added into the polymerization system before the polymerization reaction. The additive may be selected from the group consisting of heat stabilizer, thermal oxidative stabilizer and toner.

The esterification reaction of step (1) may be carried out conventionally. Esterification catalyst used by the esterification reaction may be selected from the group consisting of titanate, $TiO_2/SiO_2$, titanium chelate and catalyst of organic tin series.

The polymerization reaction of step (2) may be carried out using conventional polymerization catalyst. Preferably, polymerization catalyst is a mixture of titanate and polymerization catalyst of antimony series, which is added into the polymerization monomers in the form of its solution of 1,3-propylene glycol, Compared with prior arts, the present invention has following advantages:

1. The invention has linear polyester with low molecular weight added when polymerization reaction is going on, which can adjust the movement of chain of PTT macromolecule and effectiveness of chain rearrangement effectively, and accelerate the speed of the molecular chain entering into the lattice, thereupon, making the crystallization of macromolecule tend to come close to finish in the shortest time possible. The effect of this modification expressed at the macro level is that dyeing stability of the PTT fabric is more even and that damage resistance of the fabric and clothes is improved.

2. Using polyethylene glycol composition with low molecular weight which can maintain the original excellent characteristics like elastic resilience of the fiber of PTT polyester to the utmost may adjust the whole softness of macromolecular chain of PTT. The introduction of polyethylene glycol chain with low molecular weight increases the softness of the macromolecular chain of PTT for curling and bending, making the macromolecule rotate freely in a larger regional scope, and the macromolecular configuration further approaches closer, thus accelerating the speed of the macromolecular chain entering into the lattice considerably, improving the ability of fast crystallization of the material, and being beneficial for relieving tension of the fiber during spinning. During winding and stretching, the macromolecule may finish effective crystallization and will not recrystallize as caused by variation in condition during post process which can change basic properties of the material. Thereupon, the application scope of the PTT fiber is greatly enlarged, and there is wider space for the PTT polyester and its fiber with respect to high grade fabric in the future.

3. The excellent softness and drapability of PTT polyester are further enhanced since links of molecular chains of linear polyester with certain molecular weight and polyethylene glycol with low molecular weight match with each other, embedding into the macromolecular chain of the PTT polyester, which makes the regional vibration of the molecule and transformation of configuration easier and fiber softer and smoother at the macro level. The elastic resilience ability of the fiber is simultaneously improved 4. Because of strict addition amount, as compared with adding small molecular monomer, on the basis of ensuring enough addition amount of modifying composition and properties of target chip, the mole of modifying composition added is much lower, and influence on the glass temperature and the melting point of the chip is much smaller when adding macromolecular monomer having certain polymerization degree. Although the polyester chip shows a minor reduction in melting point, it has no big reduction in glass temperature, thus substantially no influence will be caused on the process conditions for pelletizing. The various excellent properties originally owned by the PTT polyester are well kept by the product.

5. Excellent effect is achieved by the invention from macromolecular design angle, by carrying out molecule modification and function transplantation of chain on aspects of molecular chain structure and properties of PTT macromolecule itself without requirement of special manufacturing equipment. Manufacturing equipment and other process parameters are the same with manufacturing equipment for conventional PTT, thus the invention is fit for popularization and application.

DETAILED DESCRIPTION OF THE PREFERRED EMBODIMENT

The preparation for PTT polyester comprises procedure of esterification reaction and procedure of polymerization reaction. The esterification reaction according to the invention may be carried out conventionally. The main improvement of the invention lies in adding linear polyester with average molecular weight of 800~3000 and polyethylene glycol with average molecular weight of 200~2000 into polymerization monomers before polymerization reaction so as to modify the finally obtained PTT polyester.

Addition of the linear polyester may change the regional chain structure of the PTT macromolecule, making the chain of PTT molecule rotate freely and approach closely, accelerating the effective arrangement ratio of the chain of the fiber during spinning and the crystallization speed inter fiber, and making the fiber fully crystallized, thereupon, the crystallization rate of the fiber during spinning is fixed one time, preventing change of the crystallization rate of the fiber during post-process and process of using, which leads to chromatic difference of dyeing, color bar and stress damage of the fabric. The amount of the linear polyester added is 0.5%~6% of the mass of the polymerization monomers, which must be strictly controlled, with too much, the glass temperature and melting point will have a big change, while with too little, there will be no modifying effect. Preferably, the amount of the linear polyester added is 1%~3% of the total weight of the beginning raw materials.

The above linear polyester may be a polymer obtained by reaction of $C_3$~$C_{10}$ straight chain aliphatic dicarboxylic acid or 1,4-cyclohexane diformic acid with $C_2$~$C_{10}$ straight chain aliphatic diol or 1,4-cyclohexane dimethanol, such as poly (buthylene succinate), poly (hexamethylene adipate), poly (butylene adipate), poly (hexylene succinate), poly(buthylene cyclohexane diformate), poly(cyclohexane dimethyelene cyclohexane diformate), etc.

The object of adding polyethylene glycol is to accelerate the moving speed of the macromolecule of PTT polyester and improve its softness. Polyethylene glycol of 200~1500 is preferred, so that the entire softness of the molecular chain of the PTT polyester can be adjusted in a small scope, which makes part of the macromolecular chain become softer and molecules easier to approach closely, thus providing advantageous conditions for the regularly arranged crystallization of molecules.

According to the present invention, during the polymerization procedure, the linear polyester and polyethylene glycol are preferably added into the polymerization device in molten state and fully mixed with polymerization monomers, polymerization catalyst and additives (if there is any added), and then elevated to polymerization temperature to carry out the polymerization reaction. The material is discharged when required viscosity is attained, and pelletized to get chips of PTT polyester, which can further be made into PTT fiber.

According to the present invention, esterification catalyst adopted by esterification reaction may be titanate, $TiO_2/SiO_2$ or complex catalyst of zinc acetate and catalyst of organic tin series. Preferably, catalyst is dissolved before its addition into the esterification system. One of the preferable embodiments is using 1,3-propylene glycol as solvent and simultaneously using protonic acid like organic carboxylic acid (succinic acid were adopted by all following examples) to modulate so that the catalyst dissolves forming homogeneous catalyst solution. Those skilled in the art may select suitable catalyst composition and addition amount according to the requirement of the practical reaction, which will not be elaborated here.

According to the present invention, polymerization catalyst adopted by polymerization reaction may be those frequently used in the prior art, eg. tianate, polymerization catalyst of tin series, etc. Also catalyst of more than two kinds may be used compositely. Preferably, polymerization catalyst is also dissolved in 1,3-propylene glycol before its addition into the polymerization system. Those skilled in the art may select suitable addition amount according to the requirement of the practical reaction, which also will not be elaborated here.

In addition, it should be noted by those skilled in the art that some additives may be added at esterification reaction stage or into polymerization reaction system to improve characteristics of PTT polyester finally prepared and its fiber. Types of additives may be selected according to requirement of specific application of PTT. Generally, adding heat stabilizer at polymerization stage is preferred.

The present invention will be further described below in conjunction with the embodiments. However, the invention is not limited to the following embodiments.

Example 1

A method for preparing PTT polyester chips, which comprised following steps:
1. Esterification reaction: 18 kg refinded terephthalic acid (PTA) and 8.4 kg 1,3-propylene glycol(PDO) were added into 70 L polyester experimental device, and prepared esterification catalyst solution (containing effective titanium 45 ppm, effective tin 8 ppm and 10 ppm zinc acetate) was added as well, stirred evenly, then the temperature was elevated and pressure was increased to 0.3 MPa to carry out the esterification reaction. Esterification temperature was controlled at about 245° C. Recovered the pressure to constant level and ended the reaction when there was no water produced from the esterification.
2. Polymerization reaction: 1.5 L PDO was added into the reaction system after step (1) for cooling. When the temperature in the inner kettle was cooled to 220° C., 300 g molten poly(ethylene glycol adipate) with average molecular weight of 1000, 200 g molten polyethylene glycol with average molecular weight of 600, prepared polymerization catalyst solution(containing effective titanium 90 ppm and 240 ppm antimony acetate) and stabilizer phosphoric acid 120 ppm were added, after blending for 20 min, the temperature was increased to 235° C. to carry out conventional polymerization with polymerization temperature being controlled between 245~278° C. and acuity lower than 40 Pa. When polymerization finished, pelletized the polyester to chips and conducted test. Index of the chips is indicated in Table 1.

Example 2

A method for preparing PTT polyester chips, which comprised following steps:
1. Esterification reaction: 18 kg refined terephthalic acid (PTA) and 8.4 kg 1,3-propylene glycol(PDO)(molar ratio is 1:1.25) were added into 70 L polyester experimental device, and prepared esterification catalyst solution (containing effective titanium 45 ppm, effective tin 8 ppm and 10 ppm zinc acetate) was added as well, stirred evenly, then the temperature was elevated and pressure was increased to 0.3 MPa to carry out the esterification reaction. Esterification temperature was controlled at about 245° C. Recovered the pressure to constant level and ended the reaction when there was no water produced from the esterification.
2. Polymerization reaction: 1.5 L PDO was added into the reaction system after step (1) for cooling. When the temperature in the inner kettle was cooled to 220° C., 300 g molten poly(ethylene glycol adipate) with average molecular weight of 1500, 200 g molten polyethylene glycol with average molecular weight of 400, prepared polymerization catalyst solution(containing effective titanium 90 ppm and 240 ppm antimony acetate) and stabilizer phosphoric acid 120 ppm were added, after blending for 20 min, the temperature was increased to 235° C. to carry out conventional polymerization with polymerization temperature being controlled between 245~278° C. and acuity lower than 40 Pa. When polymerization finished, pelletized the polyester to chips and conducted test. Index of the chips is indicated in Table 1.

Example 3

A method for preparing PTT polyester chips, which comprised following steps:
1. Esterification reaction: same with Example 1.
2. Polymerization reaction: 1.5 L PDO was added into the reaction system after step) for cooling. When the temperature in the inner kettle was cooled to 220° C., 500 g molten poly(ethylene glycol adipate) with average molecular weight of 2000, 300 g molten polyethylene glycol with average molecular weight of 800, prepared polymerization catalyst solution (containing effective titanium 90 ppm and 240 ppm antimony acetate) and stabilizer phosphoric acid 120 ppm were added, after blending for 20 min, the temperature was increased to 235° C. to carry out conventional polymerization with polymerization temperature being controlled between 245~278° C. and acuity lower than 40 Pa. When polymerization finished, pelletized the polyester to chips and conducted test. Index of the chips is indicated in Table 1.

Example 4

A method for preparing PTT polyester chips, which comprised following steps:
1. Esterification reaction: same with Example 1.
2. Polymerization reaction: 1.5 L PDO was added into the reaction system after step (1) for cooling. When the temperature in the inner kettle was cooled to 220° C., 800 g molten poly(ethylene glycol adipate) with average molecular weight of 3000, 200 g molten polyethylene glycol with average molecular weight of 400, prepared polymerization catalyst solution(containing effective titanium 90 ppm and 240 ppm antimony acetate) and stabilizer phosphoric acid 120 ppm were added, after blending for 20 min, the temperature was increased to 235° C. to carry out conventional polymerization with polymerization temperature being controlled between 245~278° C. and acuity lower than 40 Pa. When polymerization finished, pelletized the polyester to chips and conducted test. Index of the chips is indicated in Table 1.

Example 5

A method for preparing PTT polyester chips, which comprised following steps:
1. Esterification reaction: same with Example 1.
2. Polymerization reaction: 1.5 L PDO was added into the reaction system after step (1) for cooling. When the temperature in the inner kettle was cooled to 220° C., 400 g molten poly(hexamethylene cyclohexane diformate) with average molecular weight of 1000, 300 g molten polyethylene glycol with average molecular weight of 400, prepared polymerization catalyst solution (containing effective titanium 90 ppm and 240 ppm antimony acetate) and stabilizer phosphoric acid 120 ppm were added, after blending for 20 min. the temperature was increased to 235° C. to carry out conventional polymerization with polymerization temperature being controlled between 245~278° C. and acuity lower than 40 Pa. When polymerization finished, pelletized the polyester to chips and conducted test. Index of the chips is indicated in Table 1.

Example 6

A method for preparing PTT polyester chips, which comprised following steps:
1. Esterification reaction: same with Example 1.
2. Polymerization reaction: 1.5 L PDO was added into the reaction system after step (1) for cooling. When the temperature in the inner kettle was cooled to 220° C., 500 g molten poly(1,4-butylene adipate) with average molecular weight of 2000, 300 g molten polyethylene glycol with average molecular weight of 600, prepared polymerization catalyst solution (containing effective titanium 90 ppm and 240 ppm antimony acetate) and stabilizer phosphoric acid 120 ppm were added, after blending for 20 min, the temperature was increased to 235° C. to carry out conventional polymerization with polymerization temperature being controlled between 245~278° C. and acuity lower than 40 Pa. When polymerization finished, pelletized the polyester to chips and conducted test. Index of the chips is indicated in Table 1.

Comparative Example 1

PTT polyester chips were prepared according to conventional process with following steps: 18 kg refined terephthalic acid and 8.4 kg 1,3-propylene glycol were added into 70 L polyester experimental device, and esterification catalyst and additives were added and stirred evenly, then the temperature was elevated and pressure was increased to 0.3 MPa to carry out esterification. Esterification temperature was controlled between 220~260° C. Recovered pressure to constant level when there being no water produced from the esterification. Ensuring that the esterification finished, added polymerization catalyst and stabilizer to carry out conventional polymerization with polymerization temperature between 245~275° C. and acuity lower than 40 Pa. When polymerization finished, pelletized the polyester to chips and conducted test. Index of the chips is indicated in Table 1.

TABLE 1

| Example | Performance index | | | | | | | |
|---|---|---|---|---|---|---|---|---|
| | intrinsic viscosity (dl/g) | melting point (° C.) | content of Carboxyl end group (mg/KOHg) | Hue B value | Tg (° C.) | color of the chips | The agglomerate particles | Crtstallization rate of the chips normally pelletized(%) |
| Example1 | 0.935 | 226.3 | 14.5 | 3.6 | 46.1 | milky white | Nil | 37.9 |
| Example2 | 0.937 | 226.9 | 13.9 | 4.0 | 46.0 | milky white | Nil | 37.4 |
| Example3 | 0.918 | 225.4 | 15.2 | 3.9 | 44.6 | milky white | Nil | 38.2 |
| Example4 | 0.909 | 227.1 | 14.7 | 5.1 | 43.3 | milky white | Nil | 37.5 |
| Example5 | 0.922 | 226.5 | 16.1 | 4.6 | 42.9 | milky white | Nil | 37.1 |
| Example6 | 0.915 | 225.7 | 15.0 | 4.2 | 45.8 | milky white | Nil | 38.0 |
| Comparative Example 1 | 0.926 | 229.3 | 14.8 | 4.5 | 42 | transparent | Nil | 27.9 |

Refer to Table 1, compared with PTT polyester chips prepared according to the conventional process, the PTT polyester chips prepared according to the Examples of the present invention show a minor decrease in melting point (not restricted to theory, it is thought to be caused by decrease of intermolecular binding force due to addition of modifying additives which breaks the original macromolecular structure), and an increase of the glass temperature (not restricted to theory, it is thought that because of addition of linear polyester, the crystallizing ability of the chips is increased, and the glass temperature of chips increases synchronously with the increase of the crystallizing property and crystallization ratio)

Polyester chips of Example1~3 and Comparative Examples 1 were processed to prepare 83.3 dtex/36f FDY fiber according to conventional spinning process. Properties of fibers obtained are indicated in Table 2.

TABLE 2

Tech Technical index of 83.3dtex/36f FDY fiber made of PTT polyester

| | Performance index | | | | | | | | | |
|---|---|---|---|---|---|---|---|---|---|---|
| Example | line density (dtex) | line density deviation rate % | line density unevenness rate CV % | fracture strength cN/dtex | Breaking elongation rate % | Breaking elongation uneven rate CV % | Yarn unevenness rate CV % | boiling water shrinkage rate (%) | Degree of network per metre | Oil content % |
| Example1 | 83.0 | 0.15 | 0.46 | 2.81 | 49.8 | 5.69 | 2.00 | 11.0 | 20 | 1.10 |
| Example2 | 83.5 | 0.27 | 0.37 | 2.79 | 48.1 | 5.80 | 1.99 | 10.6 | 22 | 1.15 |
| Example3 | 83.3 | 0.37 | 0.36 | 2.75 | 50.8 | 5.54 | 2.18 | 12.7 | 19 | 1.14 |
| Example4 | 82.8 | −0.13 | 0.40 | 2.70 | 52.8 | 6.08 | 2.54 | 11.1 | 21 | 1.09 |
| Example5 | 82.3 | −0.47 | 0.48 | 2.65 | 48.6 | 5.57 | 2.10 | 8.7 | 22 | 1.00 |
| Example6 | 83.6 | 0.35 | 0.52 | 2.78 | 49.4 | 6.39 | 2.20 | 10.3 | 20 | 1.05 |
| Comparative example 1 | 83.3 | 0.77 | 0.65 | 2.89 | 40.8 | 7.54 | 2.82 | 8.1 | 23 | 1.29 |

As testified by spinning test, PTT polyester prepared by the invention has good spinning behavior and spinning stability. Compared with the Comparative Example, the strength of the fiber spinned by Examples decreased and the boiling water shrinkage rate increased, which mainly have relations with weak molecular binding force of the soft chain itself. At the same of increase of the softness of molecular chain, the strength decreases inevitably and boiling water shrinkage rate increases. However, simultaneous increase of crystallization rate makes the structural state of the fiber molecules tend to become stable. There are no phenomena of chromatic difference and color bar produced by the fabric. The phenomenon of dyeing unevenness which is ordinary during post-process and which is caused by uneven stretching tension is effectively relieved. As to aspects of fabrics and ready-made clothes, the fabric has a noticeable improved ability of damage resistance against outer force, thus reducing the scratch damage rate considerably. Meanwhile, the heat setting effect of the fabric cover has improved. The desired object of modifying design of polyester is attained.

The following examples are illustrative of the invention and are not intended to limit the scope of the invention. Various changes and modifications may be made by those skilled in the art without departing from the scope and spirit of the invention The invention has been described above in detail. Any variations or modifications that are made according to the spirit of the invention are to be covered by the scope of the invention.

The invention claimed is:

1. A method for preparing modified poly (1,3-propanediol terephthalate) polymer, comprising the following steps:
   (1) a one-step esterification consisting of esterifying terephthalic acid and 1,3-propylene glycol to get polymerization monomers in the presence of an esterification catalyst and at a temperature of 220° C.-260° C., wherein the molar ratio of terephthalic acid to 1,3-propylene glycol is 1:1.2-1.8;
   (2) a one-step polymerization consisting of polymerizing said polymerization monomers prepared by step (1) and a polymerization catalyst at a temperature of 240° C.-280° C. by addition of a linear polyester with a number average molecular weight of 800-3000 and a polyethylene glycol with a number average molecular weight of 200-2000 to obtain poly (1,3-propanediol terephthalate), Wherein, in step (2), said linear polyester is obtained by reacting C3-C10 straight chain aliphatic dicarboxylic acid or 1,4-cyclohexane diformic acid with C2-C10 straight chain aliphatic diol or 1,4-cyclohexane dimethanol, wherein the amount of said linear polyester is 0.5%-6% of the mass of said polymerization monomers, the amount of said polyethylene glycol added being 0.5%-8.5% of the mass of said polymerization monomers.

2. The method of claim 1, wherein the straight chain aliphatic dicarboxylic acid is selected from the group consisting of 1,3-propanedioic acid, 1,4-butanedioic acid, 1,5-pentadioic acid, 1,6-hexanedioic acid, 1,7-heptanedioic acid, 1,8-octanedioic acid, 1,9-nonanedioic acid and 1,10-decanedioic acid.

3. The method of claim 1, wherein the straight chain aliphatic diol is selected from the group consisting of 1,2-ethylene glycol, 1,4-butylene glycol, 1,5-pentylene glycol, 1,6-hexamethylene glycol, 1,7-heptamethylene glycol, 1,8-octamethylene glycol, 1,9-nonamethylene glycol and 1,10-decamethylene glycol.

4. The method of claim 1, wherein the linear polyester is selected from the group consisting of poly(butylene succinate), poly(ethylene glycol adipate), poly(butylene adipate), poly (hexamethylene adipate) and poly (hexylene succinate).

5. The method of claim 1, wherein the amount of the linear polyester added is 1%-3% of the mass of the polymerization monomers.

6. The method of claim 1, wherein the average molecular weight of the polyethylene glycol is 200-1500, the amount of the polyethylene glycol added is 0.5%-3% of the mass of the polymerization monomers.

7. The method of claim 1, wherein in step (2), an additive is added before the polymerization reaction, the additive being selected from the group consisting of heat stabilizer, thermal oxidative stabilizer and toner.

8. The method of claim 1, wherein in step (2), the polymerization catalyst is a mixture of titanate and polymerization catalyst of antimony series, and wherein the polymerization catalyst is added in the form of a 1,3-propylene glycol into the polymerization monomers.

9. The method of claim 1, wherein in step (1), the esterification catalyst is selected from the group consisting of titanate, TiO2/SiO2, catalyst of organic tin series and zinc acetate.

10. The method of claim 1, wherein in step (1), the esterification catalyst is first dissolved in a mixed solution of 1,3-propylene glycol and protonic acid.

11. The method of claim 1, wherein the linear polyester is poly(butylene succinate).

12. The method of claim 1, wherein the linear polyester is poly(butylene adipate).

13. The method of claim 1, wherein the linear polyester is poly (hexylene succinate).

14. The method of claim 1, wherein the amount of the linear polyester added is 1.9%-6% of the mass of the polymerization monomers.

15. The method of claim 1, wherein the amount of the linear polyester added is 2%-3% of the mass of the polymerization monomers.

* * * * *